United States Patent
Webster et al.

(10) Patent No.: US 7,677,369 B2
(45) Date of Patent: Mar. 16, 2010

(54) HYDROFORMED DRUM BRAKE SHOE ASSEMBLY FOR VEHICLES AND METHOD OF MAKING SAME

(75) Inventors: James A. Webster, Washington Township, MI (US); Cheryl A. Garrison, Shelby Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1141 days.

(21) Appl. No.: 11/290,673

(22) Filed: Nov. 30, 2005

(65) Prior Publication Data

US 2007/0119668 A1    May 31, 2007

(51) Int. Cl.
*F16D 69/00*    (2006.01)

(52) U.S. Cl. .............................. 188/250 D; 188/250 A; 188/250 H

(58) Field of Classification Search ............. 188/250 B, 188/250 D, 250 H, 254, 258, 250 A
See application file for complete search history.

(56) References Cited

U.S. PATENT DOCUMENTS

| | | | | |
|---|---|---|---|---|
| 1,571,164 A | * | 1/1926 | Smith et al. | 188/250 H |
| 1,628,388 A | * | 5/1927 | Cautley | 188/250 D |
| 1,898,310 A | * | 2/1933 | Peterson | 188/250 D |
| 5,246,093 A | * | 9/1993 | Wang | 188/336 |
| 6,701,763 B2 | * | 3/2004 | Varela | 72/61 |

* cited by examiner

*Primary Examiner*—Christopher P Schwartz

(57) ABSTRACT

A hydroformed drum brake shoe assembly for a vehicle and method of making same includes a hydroformed drum brake shoe. The hydroformed drum brake shoe assembly also includes a friction lining secured to the hydroformed drum brake shoe. The hydroformed drum brake shoe is a monolithic structure being integral, unitary, and one-piece.

14 Claims, 1 Drawing Sheet

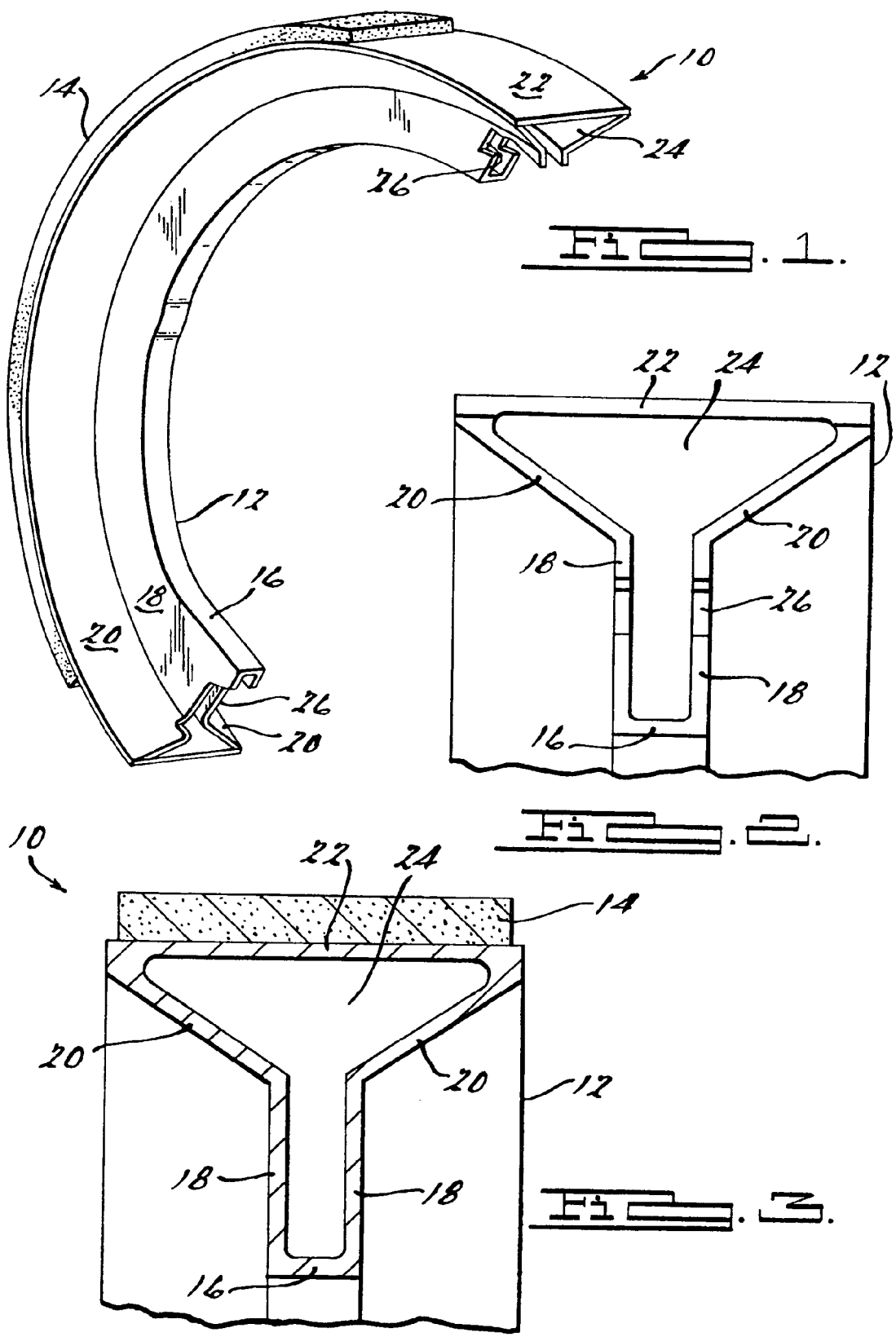

HYDROFORMED DRUM BRAKE SHOE ASSEMBLY FOR VEHICLES AND METHOD OF MAKING SAME

TECHNICAL FIELD

The present invention relates generally to hydroformed assemblies and, more particularly, to a hydroformed drum brake shoe assembly for a vehicle and method of making same.

BACKGROUND OF THE INVENTION

It is known to provide a drum brake assembly for a vehicle such as an automotive vehicle. A typical drum brake assembly includes a backing plate that is secured to a fixed, non-rotatable component of the vehicle, such as a vehicle axle housing. The drum brake assembly also includes a pair of opposed arcuate drum brake shoes that are supported on the backing plate for selective movement relative thereto. Each of the drum brake shoes has a friction pad or lining secured thereto. The drum brake assembly further includes a hollow cylindrical brake drum that is secured to the vehicle wheel for rotation therewith. The hollow interior of the brake drum defines an inner cylindrical braking surface. The brake drum is disposed adjacent to the backing plate such that the drum brake shoes extend within the cylindrical braking surface. To effect braking action, the drum brake shoes are moved outwardly apart from one another such that the friction pads frictionally engage the cylindrical braking surface of the brake drum. Such frictional engagement causes slowing or stopping of the rotational movement of the brake drum and, therefore, the wheel of the vehicle in a controlled manner. Typically, the drum brake shoe is constructed out of multiple stamped pieces.

It is also known to hydroform tubular components or members. Hydroformed tubular members are becoming increasingly popular in automotive body structural applications. During vehicle body manufacturing, many of the hydroformed tubular members are used in vehicle body and chassis applications.

As a result, it is desirable to provide a new drum brake shoe for a vehicle that reduces mass. It is also desirable to provide a new drum brake shoe for a vehicle that reduces overall cost in part fabrication and assembly. It is further desirable to provide a new method of making a drum brake shoe for a vehicle that eliminates multiple parts or welding. Therefore, there is a need in the art to provide a new drum brake shoe and method of making same that meets these desires.

SUMMARY OF THE INVENTION

Accordingly, the present invention is a hydroformed drum brake shoe assembly for a vehicle including a hydroformed drum brake shoe. The hydroformed drum brake shoe assembly also includes a friction lining secured to the hydroformed drum brake shoe. The hydroformed drum brake shoe is a monolithic structure being integral, unitary, and one-piece.

Also, the present invention is a method of making a hydroformed drum brake shoe assembly for a vehicle. The method includes the steps of providing a tubular member and a brake lining member. The method also includes the steps of hydroforming the tubular member into a drum brake shoe having a monolithic structure being integral, unitary, and one-piece. The method further includes the steps of securing the brake lining member to the hydroformed drum brake shoe.

One advantage of the present invention is that a hydroformed drum brake shoe assembly is provided for a vehicle, which eliminates multiple pieces of traditional stamped designs. Another advantage of the present invention is that a method of making a hydroformed drum brake shoe assembly is provided for a vehicle, which reduces mass. Yet another advantage of the present invention is that the hydroformed drum brake shoe assembly and method reduces part fabrication, material, and assembly cost. Still another advantage of the present invention is that the hydroformed drum brake shoe assembly and method provides a one-piece design that reduces complexity of the drum brake shoe.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a perspective view of a hydroformed drum brake shoe assembly, according to the present invention.

FIG. 2 is an elevational view of an end portion of the hydroformed drum brake shoe assembly of FIG. 1.

FIG. 3 is a fragmentary elevational view of another portion of the hydroformed drum brake shoe assembly of FIG. 1.

DESCRIPTION OF THE PREFERRED EMBODIMENT

Referring to the drawings and in particular FIG. 1, one embodiment of a hydroformed drum brake shoe assembly 10, according to the present invention, is shown for a drum brake assembly (not shown) of a vehicle (not shown) such as an automotive vehicle. In the embodiment illustrated in FIG. 1, the drum brake shoe assembly 10 includes a drum brake shoe 12 and a brake lining member 14 secured to the drum brake shoe 12. It should be appreciated that, except for the drum brake shoe 12, the brake lining member 14 is conventional and known in the art.

Referring to FIGS. 1 through 3, the drum brake shoe 12 extends circumferentially and has a generally arcuate shape. The drum brake shoe 12 also has a closed cross-section. In the embodiment illustrated, the drum brake shoe 12 is a tube having a generally "Y" cross-sectional shape. The drum brake shoe 12 has a generally arcuate shaped bottom wall 16 extending axially and a pair of opposed generally arcuate shaped side walls 18 extending radially from the bottom wall 16. The drum brake shoe 12 also has a pair of generally arcuate shaped arm walls 20 extending radially and axially outward from the side walls 18 and a generally arcuate shaped top wall 22 extending axially between the arm walls 18 forming a closed perimeter with a hollow interior chamber 24. The top wall 22 has an axial width greater than an axial width of the bottom wall 16. The drum brake shoe 12 may include at least one notch 26 in each end thereof for connection to the drum brake assembly. The drum brake shoe 12 is made of a metal material with good elongation properties such as mild steel or aluminum. The drum brake shoe 12 is formed by a hydroforming process, according to a method to be described. It should be appreciated that the drum brake shoe 12 is a monolithic structure being integral, unitary, and one-piece. It should also be appreciated that the drum brake shoe 12 may be defined as having a closed hollow cross-section.

The brake lining element 14 is generally arcuate in shape and has a generally solid rectangular cross-sectional shape. The brake lining element 14 is made of a friction material such as phenol resin. The brake lining element 14 is secured to the top wall 22 of the drum brake shoe 12 by a suitable mechanism such as an adhesive.

One embodiment of a method, according to the present invention, of making a hydroformed drum brake shoe assembly 10 is disclosed. The method includes the step of providing a metal tubular member or blank. According to one method of hydroforming, the tubular blank is placed in a die set (not shown) comprised of an upper die half and a lower die half. The ends of the tubular blank are sealed and hydraulic fluid is pumped into the tubular blank under pressure. The upper die half and lower die half are progressively closed so that the tubular blank is progressively deformed and the pressurized fluid captured therein expands the walls of the tubular blank into cavity portions of the die halves.

Once the die is closed, the tubular blank is then expanded to a final cross-sectional profile by increasing the hydraulic pressure sufficient to exceed the yield limit of the tubular blank so that the tubular blank is forced into conformity with the cavity portions of the die halves. The die halves are then opened to permit removal of the finished drum brake shoe member 12 from the die halves.

The method also includes the step of providing a brake lining member 14. The method further includes the step of securing the brake lining member 14 and drum brake shoe 12 together to form the hydroformed drum brake shoe assembly 10. The securing involves bonding the brake lining member 14 to the drum brake shoe 12 along an interface between the brake lining member 14 and the top wall 22 of the drum brake shoe 12. It should be appreciated that the bonding may be interrupted and/or continuous.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A hydroformed drum brake shoe assembly for a vehicle comprising:
   a hydroformed drum brake shoe; and
   a friction lining secured to said hydroformed drum brake shoe;
   wherein said hydroformed drum brake shoe is a monolithic structure being integral, unitary, and one-piece; and
   wherein said hydroformed drum brake shoe comprises a bottom wall, a pair of opposed side walls extending generally perpendicular from said bottom wall, a pair of arm walls extending outwardly, each arm wall of said pair of arm walls extending generally axially and radially from a respective side wall of said pair of side walls, and a top wall extending between said arm walls.

2. A hydroformed drum brake shoe assembly as set forth in claim 1 including an adhesive to secure said brake lining member to said hydroformed drum brake shoe.

3. A hydroformed drum brake shoe assembly as set forth in claim 2 wherein said adhesive joins said brake lining member to a surface of said top wall of said hydroformed drum brake shoe.

4. A hydroformed drum brake shoe assembly as set forth in claim 1 wherein said hydroformed drum brake shoe has a generally arcuate shape.

5. A hydroformed drum brake shoe assembly as set forth in claim 1 wherein said hydroformed drum brake shoe has a generally "Y" cross-sectional shape.

6. A hydroformed drum brake shoe assembly as set forth in claim 1 wherein said hydroformed drum brake shoe has a closed perimeter with a hollow interior.

7. A hydroformed drum brake shoe assembly as set forth in claim 1 wherein said hydroformed drum brake shoe is made of a metal material.

8. A hydroformed drum brake shoe assembly as set forth in claim 1 wherein said brake lining member is made of a friction material.

9. A hydroformed drum brake shoe assembly for a vehicle comprising:
   a hydroformed drum brake shoe comprising a bottom wall, a pair of opposed side walls extending generally perpendicular from said bottom wall, a pair of arm walls extending outwardly, each arm wall of said pair of arm walls extending generally axially and radially from a respective side wall of said pair of side walls, and a top wall extending between said arm walls to form a closed perimeter having a hollow interior; and
   a friction lining secured to said top wall of said hydroformed drum brake shoe;
   wherein said hydroformed drum brake shoe is a monolithic structure being integral, unitary, and one-piece.

10. A method of making a hydroformed drum brake shoe assembly for a vehicle, said method comprising the steps of:
    providing a tubular member;
    providing a brake lining member;
    hydroforming the tubular member into a drum brake shoe comprising a bottom wall, a pair of opposed side walls extending generally perpendicular from said bottom wall, a pair of arm walls extending outwardly, each arm wall of said pair of arm walls extending generally axially and radially from a respective side wall of said pair of side walls, and a top wall extending between said arm walls to form a closed perimeter having a hollow interior and having a monolithic structure being integral, unitary, and one-piece; and
    securing the brake lining member to the top wall.

11. A method as set forth in claim 10 wherein said step of hydroforming comprises hydroforming the tubular member into a hydroformed drum brake shoe having a generally arcuate shape.

12. A method as set forth in claim 10 wherein said step of hydroforming comprises hydroforming the tubular member into a hydroformed drum brake shoe having a generally "Y" cross-sectional shape.

13. A method as set forth in claim 10 wherein said step of hydroforming comprises hydroforming the tubular member into a hydroformed drum brake shoe having a closed perimeter with a hollow interior.

14. A method as set forth in claim 10 wherein said step securing comprises bonding the brake lining member to the top wall of the hydroformed drum brake shoe.

* * * * *